Figure 1:
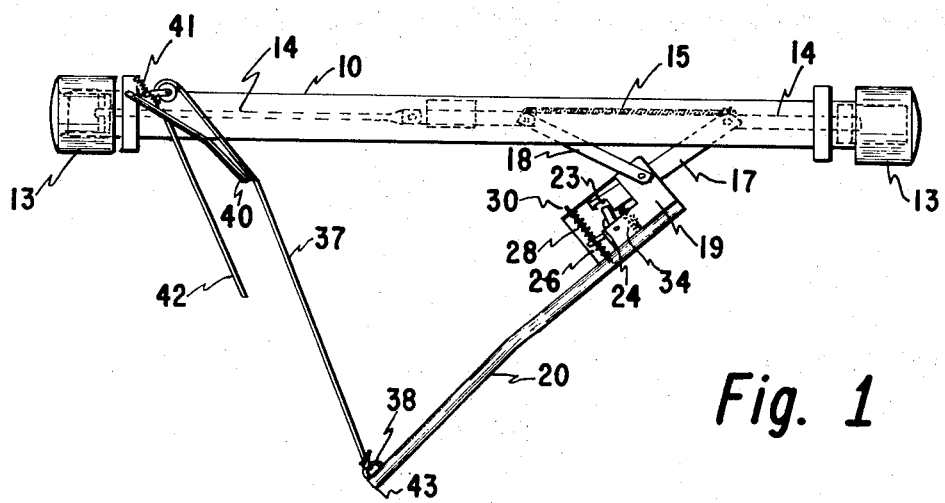

United States Patent [19]

Sundermann

[11] 3,780,833

[45] Dec. 25, 1973

[54] BRAKE FOR FARM WAGON

[76] Inventor: Henry L. Sundermann, Rt. 4, Box 79, Sioux Falls, S. Dak.

[22] Filed: Dec. 27, 1971

[21] Appl. No.: 211,907

[52] U.S. Cl................................. 188/9, 188/72.9
[51] Int. Cl............................................. B60t 7/20
[58] Field of Search................. 188/9, 72.9, 112, 188/119, 142

[56] References Cited
UNITED STATES PATENTS

| 100,357 | 3/1870 | Bicknell | 188/72.9 |
| 374,547 | 12/1887 | Loomis | 188/9 |
| 1,850,652 | 3/1932 | Beatty | 188/72.9 |
| 1,968,185 | 7/1934 | Walker | 188/72.9 X |
| 1,983,474 | 12/1934 | Lee | 188/112 |

Primary Examiner—Duane A. Reger
Attorney—Lucas J. De Koster

[57] ABSTRACT

A brake system for farm wagons or the like providing brake shoes to engage the side of wheels or tires of the wagon. The shoes are pressed against the tires or wheels by a toggle mechanism actuated by a pull on a rope to engage the brake and a subsequent pull to release the brake. Automatic means enclosed in the tongue of the wagon is adapted to set the brake as a safety device.

5 Claims, 11 Drawing Figures

PATENTED DEC 25 1973 3,780,833

SHEET 1 OF 3

INVENTOR.
Henry L. Sundermann
BY Lucas J. DeKoster
His Att'y.

INVENTOR.
Henry L Sundermann

BY

His Att'y.

INVENTOR.
Henry L Sundermann
BY
His Att'y.

BRAKE FOR FARM WAGON

BACKGROUND AND SUMMARY OF THE INVENTION

This invention pertains to braking means for farm wagons and more particularly to a brake which can be controlled from the seat of a pulling farm tractor or automatically by means within the tongue of the wagon.

Most farm wagons are not equipped with any brake at all to control their speed and motion. Since the modern farm wagon can carry very substantial loads — although generally at a fairly low speed — there is still a safety factor which must be considered. This is particularly true of loads which must be hauled up and down hills where a wagon could roll forward upon a tractor or break away from the tractor and roll back down a hill.

By my device I provide a brake which will control the wagon either manually or automatically to provide for various uses. The brake can be used as a parking brake because of a unique stepped toggle mechanism which will set firmly when the operating mechanism is actuated, and then will release when the mechanism is operated again in the same direction. The brake can also be used as an emergency braking device to hold the wagon where it is in case of a break away when the wagon accidentally comes unhitched from a pulling tractor. Thus, the wagon would break away from the tractor, but the brake would automatically set, and thereby hold the wagon where it was when it broke away.

A third use is made possible by means of a unique tongue mechanism. By using a telescoping tongue, the brake can be set up to act as a snubbing brake so that it will hold the wagon back on downhill slopes so that a loaded wagon will not overrun a tractor pulling it but will always remain in its proper relation to the tractor.

FIGURES

Figure 2:
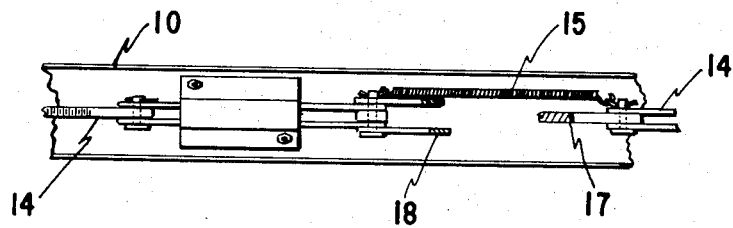
Figure 3:
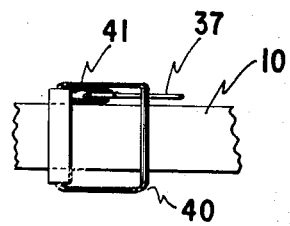
Figure 4:
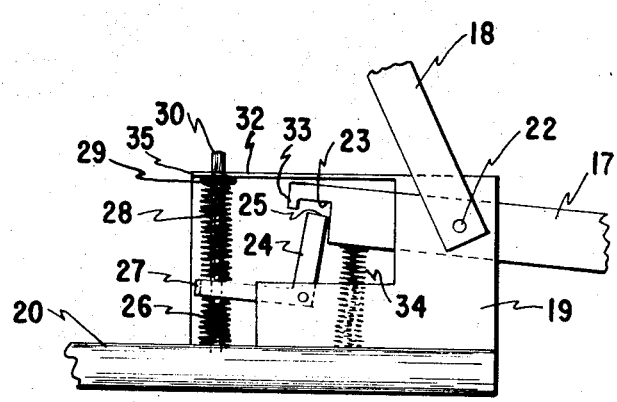
Figure 5:
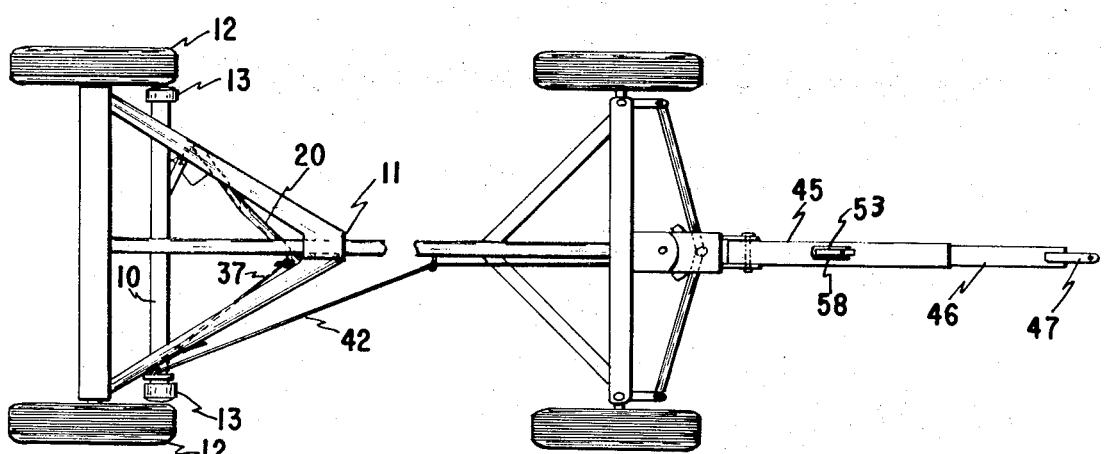
Figure 6:
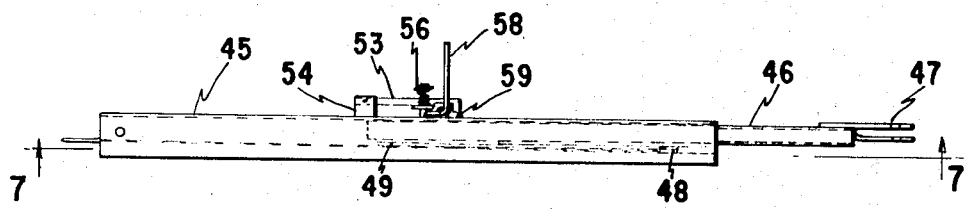
Figure 7:
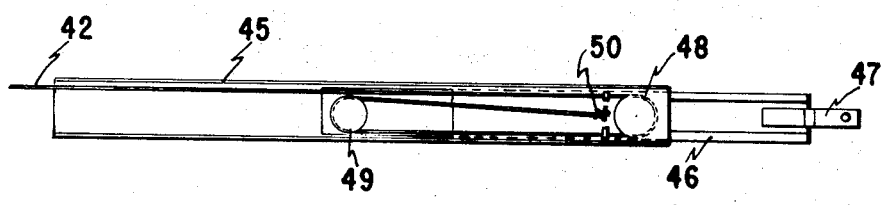
Figure 8:
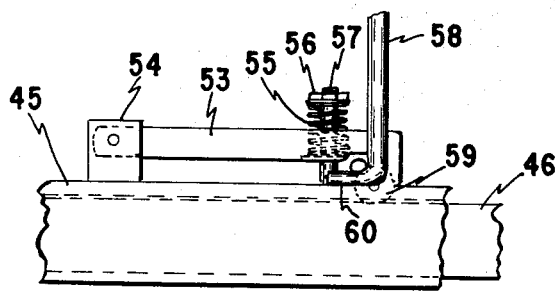
Figure 9:
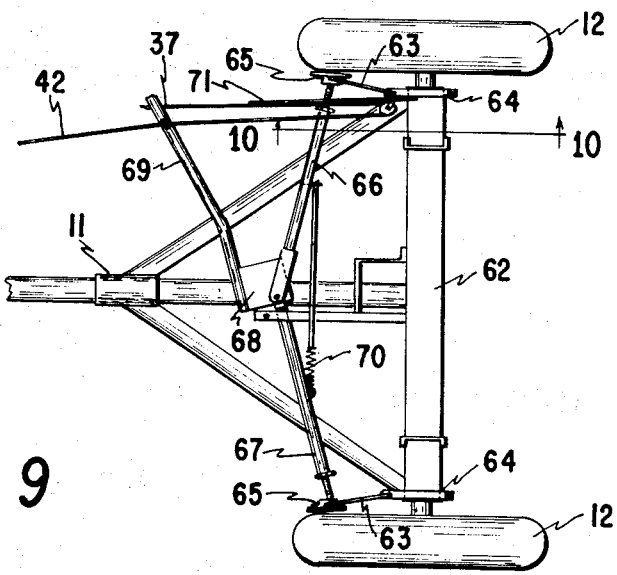
Figure 10:
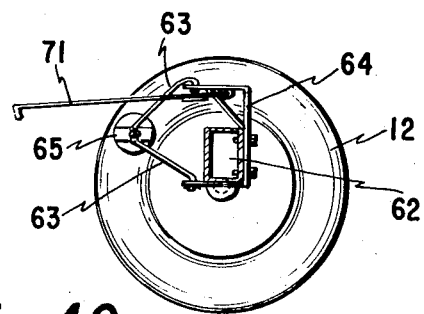
Figure 11:
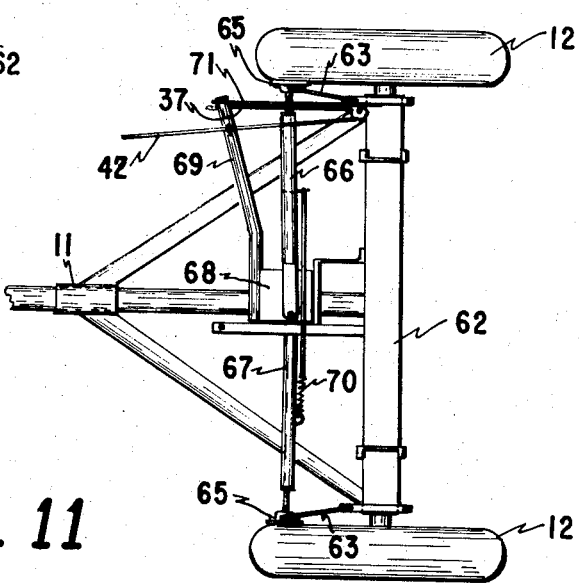

FIG. 1 is a top plan view of the brake bar removed from the wagon,

FIG. 2 is a detailed front elevational view to an enlarged scale showing the operating mechanism for moving the shoes, FIG. 3 is an enlarged detail elevational view of the holding bracket in place on the brake member, FIG. 4 is a greatly enlarged detail view of the toggle release device separated from the device, FIG. 5 is a plan view of a wagon chassis with the brake and automatic tongue control in place, FIG. 6 is an elevational view of the tongue control, FIG. 7 is a sectional view along line 7—7 of FIG. 6, FIG. 8 is an enlarged detailed view of the control member on the tongue, FIG. 9 is a top plan view of an alternate brake mechanism, and FIG. 10 is a view from line 10—10 of FIG. 9.

DESCRIPTION

Briefly, my invention comprises a braking system for a farm wagon which provides a measure of control and a positive safety brake. The system includes a toggle operated pair of brake shoes which press against the tires on the rear wheels of the wagon. The toggle is a stepped toggle so that successive operation of the control lever first sets and then releases the brake. An optional safety control built into the tongue of the wagon is also provided.

More specifically, and referring to the drawings, the principal operating mechanism of my device includes a housing 10 which is fixed to the frame 11 of a wagon (FIG. 5) in a position to be generally aligned with the tires 12 on the rear wheels of the wagon. The brake shoes 13 may take the form of caps for the housing 10 and are slidably mounted relative to the housing. The shoes are connected to rods 14 slidably journalled in the housing and should be adjustable within reasonable limits to provide for slight differences in tire size or spacing. A tension spring 15 between the rods 14 is used to urge the brake shoes to a normally withdrawn or released position as shown in FIG. 1.

The operating mechanism to engage the brakes in generally an over-the-center toggle mechanism. This includes a toggle lever 17 and a connecting link 18 each pivotally connected to one of the rods 14 and also pivoted together at a bracket 19 on an operating lever 20.

The stepped toggle device is generally supported by the bracket 19, as best shown in FIG. 4. The pivotal connection between the lever 17 and link 18 is on an axis defined by a rivet, bolt or pin 22 extending through the bracket. The lever 17 extends past that axis and is shaped to form a notched end 23.

In order to provide for motion in a rigid condition to the engaged position where the shoes 13 are extended into engagement with the tires 12, it is necessary to block the pivotal motion between the lever 17 and the lever 20 with its associated bracket 19. This is accomplished by use of a bell crank shaped engagement lever 24 pivotally mounted in the bracket. One end 25 of this lever is adapted to engage the notched end 23 of the toggle lever 17 as shown. The engagement lever 24 is normally held in this position by the urging of a compression spring 26 engaged between the operating arm 20 and the opposite end 27 of the lever 24.

This normal holding may be overridden, however, by the action of a second compression spring 28. This spring is engaged between the end 27 of the lever 24 and a collar 29 on a pin 30. The pin 30 is slidably mounted in an extension wall 32 of the bracket 19 and may extend into a socket in the arm 20.

The springs 28 and 26 are so proportioned that when the pin 30 is free as shown in FIG. 4, the spring 26 is stronger and holds this lever 24 in the position shown. However, when the pin 30 is pressed toward the wall 32, the compression force of spring 28 becomes greater than that of spring 26 and the tendency is for the lever 24 to move to an alternate or open position. The notched end 23 will prohibit this motion so long as the end 25 of the lever 24 will be caught by the lip 33. However, upon motion of the end 25 away from the notched end 24, the engagement between the two will then be broken and the bracket 19 will then be free to pivot on the toggle lever 17.

A compression spring 34 tends to hold the toggle lever 17 and the bracket 19 in a pivotal position where the end 23 engages the wall 32. This urging is not strong, however, and when an operating force is applied to the arm 20, the spring 34 is readily compressed so that the end 25 of the operating lever 24 readily moves into engagement with the end 23 of the toggle lever 17.

A review of the operation of this mechanism may be helpful in the understanding of this device. In the normal relaxed position, shown in FIG. 4, the spring 34 tends to hold the lever 17 in a slightly tilted position relative to the arm 20. At this stage, the operating lever 24 is under control of the spring 26 so that it is held in position for the end 25 to engage the notched end 23 of lever 17 although that engagement does not then take place. As force is applied to the arm 20, the urging of the spring 34 is soon overcome and the engagement between the end 25 of operating lever 24 and the notched end 23 of lever 17 takes place creating a solid engagement which, on further motion of arm 20 causes the toggle action between the lever 17 and link 18. This motion forces the outward movement of the bars 14 in the housing 10 and consequent engagement between the shoes 13 and the tires 12.

Further movement of the arm 20 eventually results in the bracket 19 being moved into the housing 10 until the pivotal axis 22 is carried beyond the line between the bars 14. At this point, the toggle has gone "over-the-center" and no longer requires force to move further in that same direction.

Motion is eventually stopped by engagement of the pin 30 with the rear wall of the housing 10. As this pin is pressed inwardly by this engagement, the spring 28 is compressed until its force exceeds that of spring 26. So long as force is applied to the arm 20, the spring action causes no change in position of the lever 24. However, as the toggle goes over the center, force is no longer required on the arm 20 and shortly will be released by the operator.

As the force is released, the bracket 19 is tilted relative to the lever 17 again through action of the spring 34. This movement releases the end 25 of lever 24 from the lip 33, and since the spring 28 now exerts the greater force (because the pin 30 is now depressed) the engagement between the levers 24 and 17 is broken. Therefore, a successive exertion of force on the arm 20 will not be transmitted to the lever 17. Instead, pivotal motion can take place. As a result, the edge 35 of the wall 32 engages the wall of the housing 10 and acts as a fulcrum. Motion of the arm 20 causes pivoting about this fulcrum and moves the pivotal axis 22 again to its original side of the center line between the rods 14. The spring 15 then retracts the rod 14 and returns the mechanism to its original position. Release of the force on the arm 20 then allows the spring 34 to reset the position between the arm 20 and lever 17. By this time, the pin 30 has again extended allowing the spring 26 to take over and the lever 24 is also returned to position so that the cycle can again take place.

Control of the brake mechanism is through the arm 20. This may be moved by means of a rope 37 attached to the arm 20 at a loop 38 on one end. In order to prevent vibration from releasing the mechanism when in its over-the-center position, I have found it desirable to provide a latch means for holding the arm. This latch means takes the form of a loop 40 pivotally mounted on the housing 10 on a line near the place where the end of the arm lies when in that position. The loop is lightly urged to a position lying adjacent the housing by a spring 41.

The rope 37 is guided past the loop 40 as shown in FIG. 1 so that tension on the pulling end 42 will pull the arm 20 toward the housing 10. This tension tends to straighten the rope and thus to move the loop 40 against the pulling of the spring and away from the housing. The spring 41 is of such strength and the location and shape of the loop 40 is such, that a normal pulling tension in the rope 37 will move the loop 40 beyond the end of the arm 20 as it approaches the housing. As the mechanism goes over the center and tension on the rope is relaxed, the loop 40 is pulled toward the housing by the spring 41 and covers the end of the lever 20. A small lip 43 may be formed on the lever to ensure the engagement.

When the end 42 is again pulled, the rope 37 again tends to straighten. Movement of the arm 20 disengages the lip 43 from the loop 40, and then, as the arm 20 moves away from the housing, there is still sufficient tension in the rope 37 to hold the loop 40 out of engagement with the arm 20 and the entire mechanism moves to the fully released position.

This form of control is especially designed for control directly by hand or by controlled operating lever from the seat of the tractor; and may be most appropriate as a parking brake. It may also be useful as a breakaway brake by fastening the rope to the tractor so that if the wagon breaks away, the rope will be pulled to set the brake.

A somewhat different type of control for a slightly modified brake is illustrated in FIGS. 5-8. In this embodiment, there is no need for the loop engagement of the arm to set the brake. The relation between the tractor and the wagon acts to accomplish the necessary results.

In this embodiment, the brake device may be substantially the same as described. The control of the brake is, however, different. This control includes the rope 42 which is draped along the wagon until it gets to the tongue.

The tongue of the wagon is formed of two telescoping parts. The outer part 45 may be pivoted to the wagon in the ususl way. The inner part 46 is slidably telescoped within the outer part 45 and may carry the usual clevis 47 by which the wagon is attached to the drawbar of a tractor.

As best shown in FIG. 7, each of the parts of the tongue carries a pulley over which the rope 42 is trained. The first pulley 48 is mounted on the outer part 45 and the second pulley 49 on the inner part 46. The rope extends first about the first pulley 48 then over the second pulley 49 to a loop 50 on the outer part 45 of the tongue.

This arrangement results in a condition in which the rope 42 will be pulled into the tongue as the telescoping parts are collapsed together. With the mechanical advantage of two, the rope will be withdrawn a distance twice as great as the amount of shortening of the tongue by the collapsing action.

Means to control the movement of the tongue are alos provided. This includes a spring loaded pressure arrangement preferably located atop the outer member 45 of the tongue (FIG. 8). A lever 53 is pivotally connected to ears 54 mounted on the member 45. Spring loading is accomplished by use of a relatively heavy compression spring 55 engaged between a collar 56 on a stud 57 attached to the member 45 and the lever 53 or a bracket thereon. Thus, there is a strong urging of the lever towards the member 45.

A yoke shaped roller-carrying lever 58 adapted to embrace the lever 53 is pivotally journalled to that lever. This yoke shaped lever carries a roller 59. In normal operation, the roller 59 extends through an opening in the upper part of the member 45 and is pressed with considerable force against the upper surface of the inner part 46. This upper surface may be dimpled or even slotted or the upper surface of the inner part 46 may be provided with a protuberance to provide for more positive holding action if desired, but ordinarily, enough friction is generated between the inner and outer parts of the tongue by the heavy pressure of the spring so that an almost positive pulling engagement is achieved. Also, the inner member 45 is constructed so that there is a positive engagement between it, or the pulley on it and some part of the outer member so that there is a positive limit to the amount of extension possible between these two members.

Although the normal condition of operation requires a strong spring loaded pressure between the roller 59 and the inner member 46, means are provided to release that pressure. This means is simply an abutment leg 60 on each end of the yoke lever 58. Thus, by pressing the lever to a downward position embracing the lever 53, the yoke lever carries the legs 60 into contact with the upper surface of the outer member 45 adjacent the opening through which the roller 59 extends. By properly proportioning the length of the legs 60, it is possible to provide that full depression of the yoke lever 58 will result in a complete release of the roller 59 from any engagement with the inner member 46. Thus, the inner member would then be free to slide within the outer member. This situation is desirable for attaching the tongue to a pulling tractor or the like when accurate alignment may be necessary, but somewhat difficult of achievement. Simply sliding the tongue out to the drawbar of the tractor, or in to meet the drawbar would be all that was necessary to align the clevis 47 with the drawbar.

After the tongue is attached to the pulling device, the yoke lever 58 is released by raising it to the position shown in FIG. 8. The roller 59 is then in heavy frictional engagement with the inner member 46 and causing frictional engagement between the inner member and the outer member 45 of the telescoping tongue. Ordinary pulling or backing will not cause any slippage, but a sudden stop or excessive force tending to stop the trailing wagon through the tongue would cause slippage between the members. As the tongue collapses, the end 42 of the rope is pulled up and tends to set the brake on the rear wheels. Thus, if there is a sudden or emergency stop of the tractor, or if the wagon is on a downhill slope of sufficient magnitude, there is a safety brake on the rear wheels of the wagon which will drag and prevent overrunning of the tractor by the wagon.

An alternate, and simpler brake mechanism may also be used with the collapsing tongue. This mechanism is illustrated in FIGS. 9 and 10. In this embodiment, the wagon frame 11 carries the wheels 12 on a rear axle assembly 62 as before. However, instead of providing a housing to carry a sliding mechanism, I provide a linkage arrangement adapted to swing the brake shoes into engagement with the tires.

The linkage comprises principally a pair of swinging links 63 pivotally attached to the rear axle by means of brackets 64. The brake shoe 65 is pivoted on the link 63 in position to engage the tire. Force to cause the engagement is provided by a toggle arrangement consisting of a pair of arms connected to the shoes 65. The shorter arm 66 is pivotally connected to one brake shoe, and to the longer arm 67. The longer arm is also connected to a brake shoe, but may extend beyond the connection with the shorter arm 66 as a unitary member, or may be provided, as shown with a toggle release device 68 similar to that previously described.

If the toggle release device 68 is used, the extending lever 69 is actuated by the rope 37 just as in the previously described embodiment. If no release device is used, the arm 67 may simply extend beyond its pivotal connection with the shorter arm 66 to receive the rope. The lever 71 with the hook on the end may be used to catch the extending lever 69 to hold it in the same manner as the loop 40 operates in the previously described embodiment. The rope 37 contacting th lever 71 at the hook will also release it in the same manner.

A spring 70 connected between the arms 66 and 67 is used to assure full release of the brake shoes in the released position.

In use, this device operates in substantially similar manner to the device illustrated in FIGS. 1 to 5. It is somewhat more open to mud, water and the like, but is also somewhat simpler and therefore less expensive.

I claim:

1. A brake system for a farm wagon or the like comprising brake shoe means movably mounted on said wagon adapted to engage the surface of tires on said wagon, actuating means for said shoes including toggle means connected to said shoes to press said shoes against said tires, said toggle means including a stepped toggle release mechanism whereby said brake shoes can be alternately set and released by successive movement of said mechanism in the same direction, and flexible means connected to said toggle means to actuate the toggle.

2. A brake system for a farm wagon or the like comprising brake shoe means movably mounted on said wagon adapted to engage the surface of tires on said wagon, actuating means for said shoes including toggle means connected to said shoe to press said shoes against said tires, said toggle means comprising two links pivotally connected together, at least one of said links being extended to form an operating lever, and flexible means connected to said operating lever to actuate said toggle.

3. The device of claim 2 in which latch means are provided on said wagon in position to catch said operating lever, said flexible means engaging said latch means so that tension on said flexible means tends to release the catching engagement between said latch means and said operating lever.

4. The device of claim 1 in which said shoes are mounted on rods, said rods being slidably disposed within a housing, said housing being mounted on the wagon, said toggle means being operably connected to said bars to actuate them.

5. The device of claim 1 in which said shoes are pivotally mounted on swinging links, said links being pivotally connected to said wagon, said toggle-means including two arms pivotally connected to said shoes whereby actuation of said toggle means causes said shoes to move outwardly against the surface of said tires.

* * * * *